United States Patent [19]
Hasushita et al.

[11] Patent Number: 5,625,487
[45] Date of Patent: Apr. 29, 1997

[54] DEVICE FOR ADJUSTING THE DIOPTER SETTING OF A FINDER ASSEMBLY

[75] Inventors: Sachio Hasushita; Tetsuya Abe; Shuji Yoneyama; Hirofumi Matsuo; Ryota Ogawa; Ichiro Taguchi; Hidetaka Yokota, all of Tokyo, Japan

[73] Assignee: Asahi Kogaku Kogyo Kabushiki Kaisha, Tokyo, Japan

[21] Appl. No.: 385,986

[22] Filed: Feb. 9, 1995

Related U.S. Application Data

[62] Division of Ser. No. 882,958, May 14, 1992.

[30] Foreign Application Priority Data

| May 17, 1991 | [JP] | Japan | 3-210534 |
| May 17, 1991 | [JP] | Japan | 3-66601 U |
| Jul. 9, 1991 | [JP] | Japan | 3-61006 U |

[51] Int. Cl.⁶ ............................... G02B 23/00
[52] U.S. Cl. .................. 359/432; 359/422; 359/431
[58] Field of Search ........................... 359/364–366, 359/421–422, 431–433, 642, 676, 820, 846–853; 354/155, 162–166, 199, 201, 219–225

[56] References Cited

U.S. PATENT DOCUMENTS

| 3,205,774 | 9/1965 | Estes | 359/820 |
| 3,493,290 | 2/1970 | Traub | 359/642 |
| 3,876,875 | 4/1975 | Velzel | 359/364 |
| 4,081,809 | 3/1978 | Kuboshima | 354/199 |
| 4,757,336 | 7/1988 | Nakayama et al. | 354/219 |
| 4,772,111 | 9/1988 | Shimura et al. | 359/848 |
| 4,779,969 | 10/1988 | Sato et al. | 359/422 |
| 4,842,395 | 6/1989 | Sato et al. | 359/380 |
| 4,906,078 | 3/1990 | Inabata et al. | 359/423 |
| 5,028,125 | 7/1991 | Kikuchi | 359/432 |
| 5,067,808 | 11/1991 | Alscher | 359/820 |
| 5,117,247 | 5/1992 | Nakai et al. | 354/164 |
| 5,124,836 | 6/1992 | Kikuchi | 359/432 |
| 5,191,477 | 3/1993 | Abe et al. | 359/695 |
| 5,257,129 | 10/1993 | Morooka et al. | 359/432 |

FOREIGN PATENT DOCUMENTS

| 196716 | 10/1985 | Japan | 359/820 |
| 2241351A | 8/1991 | United Kingdom . | |

Primary Examiner—Thong Nguyen
Attorney, Agent, or Firm—Sughrue, Mion, Zinn, Macpeak & Seas

[57] ABSTRACT

A mechanism for adjusting the diopter setting of a finder assembly which has an objective optical system and an eyepiece optical system, includes an object side image forming position adjusting device which adjusts the position where an image is to be formed by the objective optical system. The mechanism effectively compensates for any change that occurs in the position where an image is formed by the objective optical system due to temperature or humidity variations. Thus, the problem of plastic lenses having their focal lengths extended in a hot and humid environment is solved by the invention.

5 Claims, 12 Drawing Sheets

DEVICE FOR ADJUSTING THE DIOPTER SETTING OF A FINDER ASSEMBLY

This is a divisional of application Ser. No. 07/882,958 filed May 14, 1992, pending.

This application is based on and claims priority from Japanese Application No. HEI 3-210534 filed May 17, 1991, Japanese Utility Model Applications No. HEI-3-66601 filed May 17, 1991 and No. HEI-3-61006 filed Jul. 9, 1991, the disclosure of which is incorporated herein by reference.

The present invention relates to a finder assembly for use with cameras, and more particularly to a device for adjusting the diopter setting (e.g., the dioptric strength) of the finder assembly.

BACKGROUND OF THE INVENTION

A basic object of a finder assembly is the formation of the image of an object with an objective optical system and then observation of the formed object image with an eyepiece optical system. To reduce the weight and cost of the finder assembly, various attempts have been made recently to replace part or all of the image composing lenses by resins or plastics. However, the shape and refractive index of a plastic lens varies greatly in response to temperature or humidity changes.

Recently, a Kepler-type finder having an objective optical system with a positive power has been designed such that lenses having a strong power are used in a composing lens group to reduce the overall size. Since lenses having strong power vary greatly in optical performance due to changes in their shape or refractive index, the position of the object image formed by the objective optical system will become unfocussed greatly from the plane of the field frame.

A finder assembly usually has a mechanism for adjusting the diopter setting, which has heretofore been adapted to adjust the diopter setting of the eyepiece optical system. Such a conventional mechanism for adjusting the diopter setting may be capable of ensuring that the focus of the eyepiece optical system is brought into registry (e.g., aligned) with the position in which the image is formed by the objective optical system. However, in the conventional mechanism, the position of the image formed by the objective optical system and the position of the field frame is changed so much that the field frame is blurred such that the field frame and the object image cannot be observed clearly simultaneously. A further problem with the large change in the position of the image formed by the objective optical system is that the mechanism for adjusting the diopter setting of the eyepiece optical system is insufficient to permit the object image per se to be observed clearly through effective adjustment of the diopter setting.

SUMMARY OF THE INVENTION

The present invention has been designed to remedy the above-mentioned problems of the conventional systems. The inventive design is based on either that, in a finder assembly using plastic lenses, the position of image formation by the objective optical system varies so greatly that the mechanism for adjusting the diopter setting of the eyepiece optical system is insufficient to permit both the object image and the field frame to be clearly observed, or that the adjustment of the diopter setting becomes impossible if a great offset occurs in the position of the object image formed with the objective optical system. Thus, the principal object of the present invention is to provide a finder assembly that ensures positive adjustment of the diopter setting even if a change occurs in temperature and/or humidity.

Basically, the present invention provides a finder assembly that comprises an objective optical system and an eyepiece optical system and which has at least the composing lenses made of resin. The finder assembly includes an object side image forming position adjusting device which adjusts the position where an image is formed by the objective optical system.

If the position of the image formed by the objective optical system can be adjusted properly, the position of the object image can be aligned with the image viewing position by the eyepiece optical system, so that a clear image can be observed.

Theoretically, the adjusting device of the present invention is applicable not only to a Kepler-type finder assembly in which the objective optical system has a positive power, but also to a reverse-Galilean finder in which the objective optical system has a negative power. However, as mentioned above, the present invention is particularly useful if it is applied to a Kepler-type finder assembly which recently has been designed to use lenses having a strong power in the lens groups forming the objective optical system and which have a positive overall power. A Kepler-type finder assembly has a field frame in the image forming plane of the objective optical system, and it must be adjusted such that the object image will be formed in the plane of the field frame.

The object side image forming position adjusting device may include an optical element that is situated in the optical path between the objective optical system and the field frame and which changes its power according to temperature and/or humidity variations. In a specific embodiment, the optical element may be a mirror that has a reflecting member forming a mirror surface and a substrate which is joined to the reflecting member and which has a different coefficient of thermal expansion or expansion due to moisture absorption from that of the reflecting member.

The object side image forming position adjusting device may be an optical path length altering optical member which changes the length of the optical path between the objective optical system and the field frame. The optical path length altering optical member may include a movable prism or mirror.

If desired, the object side image forming position adjusting device may be adapted to move the objective optical system in its entirety along the optical axis. Alternatively, the objective optical system may include a plurality of lens groups, and the object side image forming position adjusting device may be adapted to selectively move one or more of the lens groups.

DETAILED DESCRIPTION OF THE PREFERRED EMBODIMENTS

The present invention is described below with reference to the several embodiments shown in the accompanying drawings.

Figure 12:
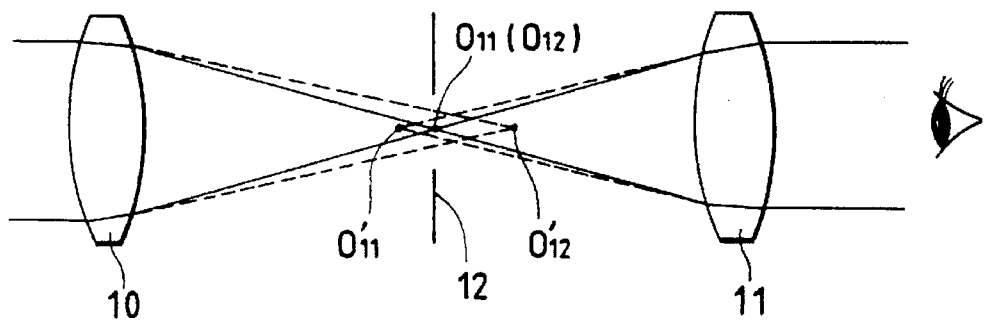
FIG. 12 is a schematic optical path diagram showing how the diopter setting is varied in a Kepler-type zoom finder assembly.

First, the problems with the conventional finder assembly which are to be solved by the present invention are identified below with reference to FIG. 12 which depicts schematically how the diopter setting is varied by an objective optical system 10 and an eyepiece optical system 11 in a Kepler-type finder assembly. A field frame 12 is located in a position where the image of an object at a standard distance is formed by the objective optical system 10. Both the object image formed by the objective optical system 10 and the field frame 12 are observed by the viewer through the eyepiece optical system 11. The design focal positions (image forming positions) $O_{11}$ and $O_{12}$ of the objective optical system 10 and the eyepiece optical system 11, respectively, coincide with the field frame 12 as indicated by solid lines in FIG. 12.

However, plastic lenses utilized in the conventional finder assembly are affected by temperature and/or humidity increases such that their radii of curvature will increase and their refractive indices will decrease due to thermal expansion or moisture absorption. Hence, the focal lengths of plastic lenses will increase upon temperature or humidity elevation. Dotted lines in FIG. 12 illustrate (in exaggeration for clarity) that the focal positions $O'_{11}$ and $O'_{12}$ of the objective optical system 10 and the eyepiece optical system 11, respectively, are out of alignment with the field frame 12 as a result of their focal lengths having been extended as compared with the design values.

The changes in the focal position of the objective optical system 10 have not been considered in the conventional method of adjusting the diopter setting. Instead, the conventional approach has been to change the focal position of the eyepiece optical system 11 according to the dioptric strength of the viewer. However, if the focal position of the objective optical system 10 changes greatly, the position of the object image will deviate greatly from the plane of the field frame 12, making it impossible for the viewer to discern both the object image and the field frame clearly. Another problem is that a clear object image is not discernible by merely adjusting the diopter setting with the eyepiece optical system 11.

Figure 1:
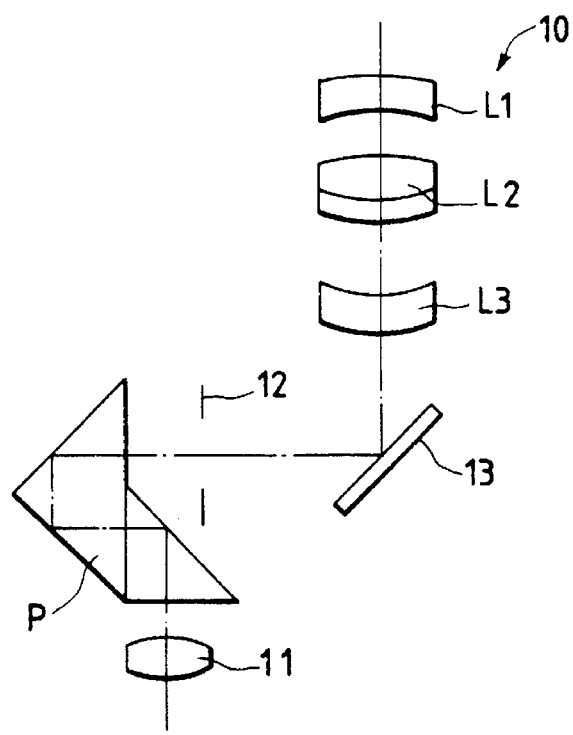
FIG. 1 is an optical diagram showing schematically a finder assembly according to a first embodiment of the present invention.
Figure 2:
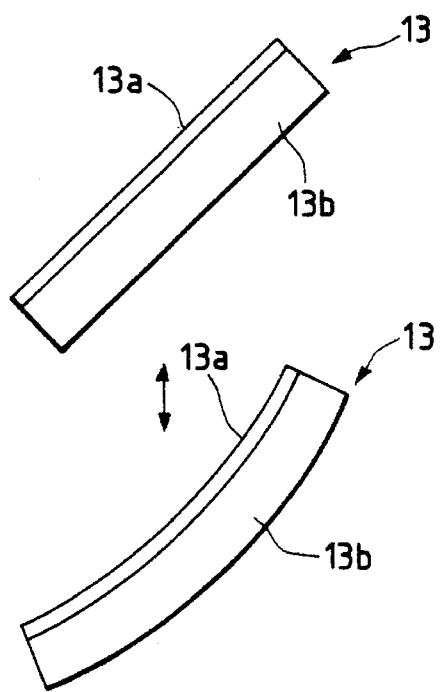
FIG. 2 is a front view of a mirror in FIG. 1 showing how the shape thereof will change in response to variations in temperature (or humidity)

The present invention solves the aforementioned problems of the conventional systems by providing an object side image forming position adjusting device associated with the objective optical system 10. A first embodiment of the present invention is shown in FIGS. 1 and 2 in which the present invention is applied to a Kepler-type zoom finder assembly. As shown, the objective optical system 10 comprises a fixed lens L1, lenses L2 and L3 which are movable for zooming, and a mirror 13. A field frame 12 is provided in a position where the image of an object at a standard distance is formed by the objective optical system 10. Positioned behind the field frame 12 is a porro prism P which inverts and reverses rightwardly and leftwardly the object image formed by the objective optical system 10. An eyepiece optical system 11 is located behind the Porro prism P.

As shown in FIG. 2, the surface of mirror 13 is planar and has no power at ambient temperature (the design temperature). However, when the temperature and/or humidity rises, mirror 13 deforms to be a concave mirror. The mirror 13 has a reflecting member 13a serving as a mirror surface, and a substrate 13b which is bonded to the reflecting member 13a and which has a different thermal expansion coefficient from that of the reflecting member 13a. The substrate 13b may be a synthetic resin substrate, on which the reflecting member 13a, which may be made of aluminum, can be coated. Synthetic resins have thermal expansion coefficients about three times higher than aluminum, and swell upon moisture absorption. Hence, the surface of the reflecting member 13a will become concave if the temperature and/or humidity rises. A concave mirror has a positive power, thereby shortening the focal length of the objective optical system 10 which would otherwise be extended. As a result, the object image formed by the objective optical system 10 can be properly focused on the field frame irrespective of the temperature or humidity changes.

Figure 3:
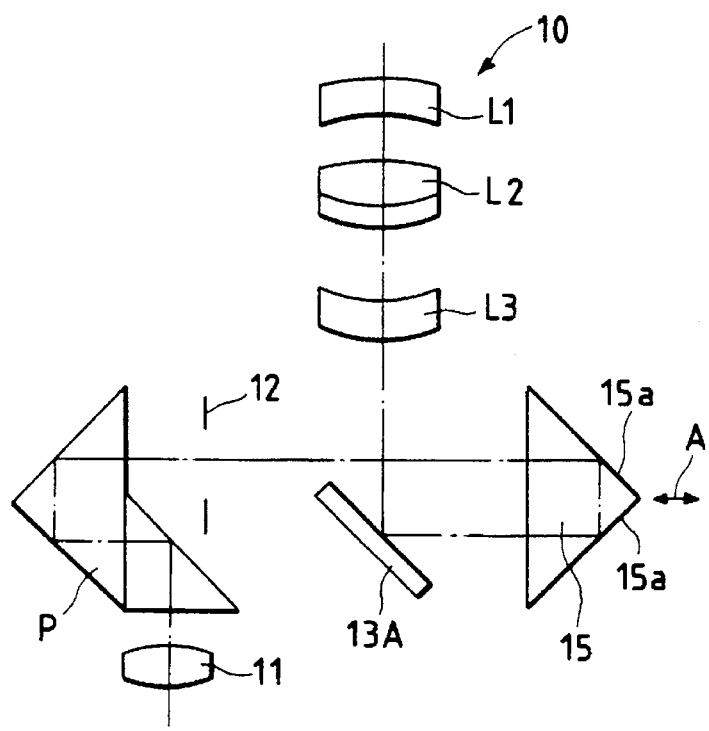
FIG. 3 is an optical diagram showing schematically a finder assembly according to a second embodiment of the present invention.

A second embodiment of the present invention is shown in FIG. 3 in which the optical path length of the objective optical system 10 is adjusted so that the position of the object image formed by the objective optical system 10 is aligned with the plane of the field frame 12 even if a change in the focal length of the objective optical system 10 occurs. The objective optical system 10 has a movable prism 15 situated in the optical path between a fixed mirror 13A and a field frame 12. The movable prism 15 has two total reflecting faces 15a that cause the optical path to bend by 90° in the same direction. By moving the prism 15 in the direction indicated by arrow A, the optical path length of the objective optical system 10 can be varied. Therefore, if the focal length of the objective optical system 10 is extended, the prism 15 may be moved in a direction that increases the optical path length, whereby the object image formed by the objective optical system 10 can be focused on the field frame 12.

Figure 3A:
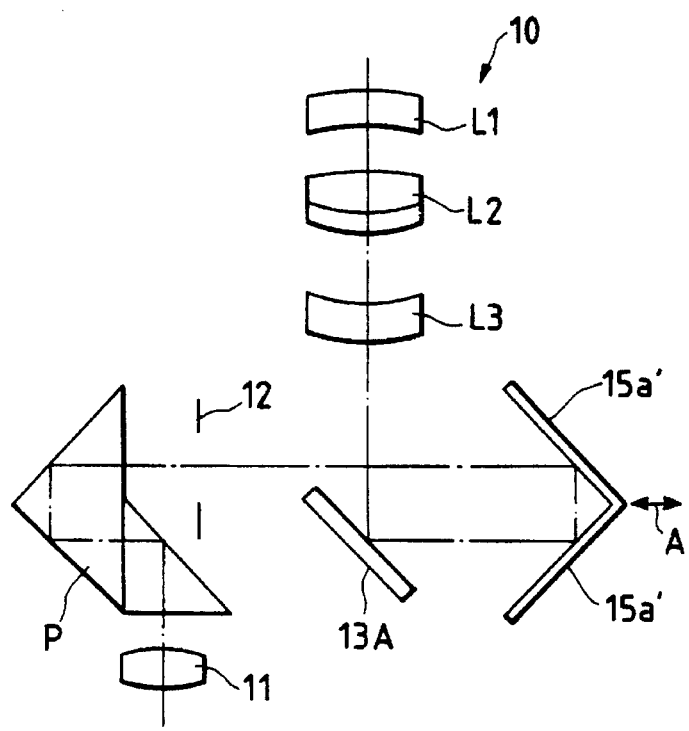
FIG. 3A shows a view showing a modification using a pair of mirrors, similar to the assembly shown in FIG. 3.

It is quite apparent that instead of the prism 15, a pair of angled mirrors 15a' may be used as shown in FIG. 3A. The mirrors 15a' are movable in the direction indicated by the arrow A.

Figure 4:
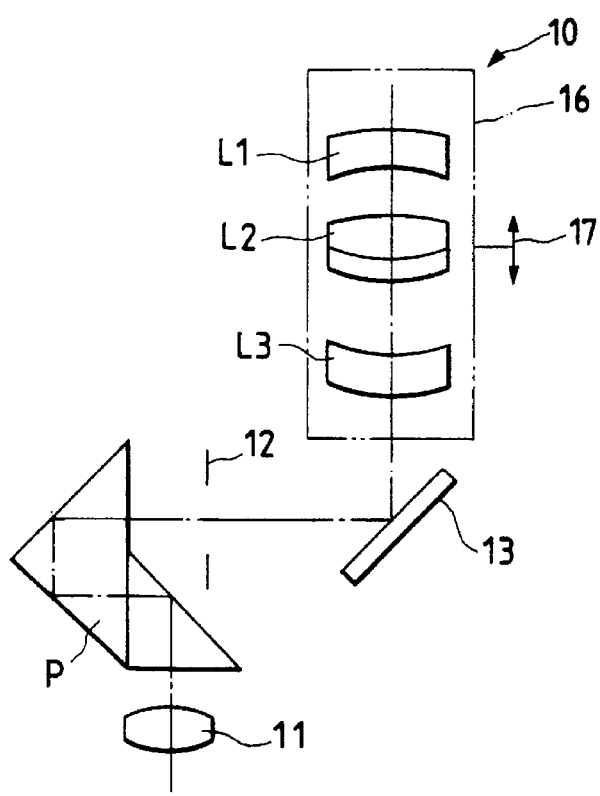
FIG. 4 is an optical diagram showing schematically a finder assembly according to a third embodiment of the present invention.

A third embodiment of the present invention is shown in FIG. 4 in which the fixed lens L1 and movable lenses L2 and L3 in the objective optical system 10 are moved together simultaneously along the optical axis to adjust the focal position of the objective optical system 10. The fixed lens L1 and movable lenses L2 and L3 are supported on an adjusting frame 16 which is movable along the optical axis independently of the zooming mechanism and which is fitted with a device 17 for effecting positional adjustment of the adjustment frame along the optical axis. Therefore, if the focal length of the objective optical system 10 is extended, the adjusting frame 16 may be moved by manipulating the adjusting device 17, whereupon the object image formed by the objective optical system 10 can be focused on the field frame 12.

Figure 5:
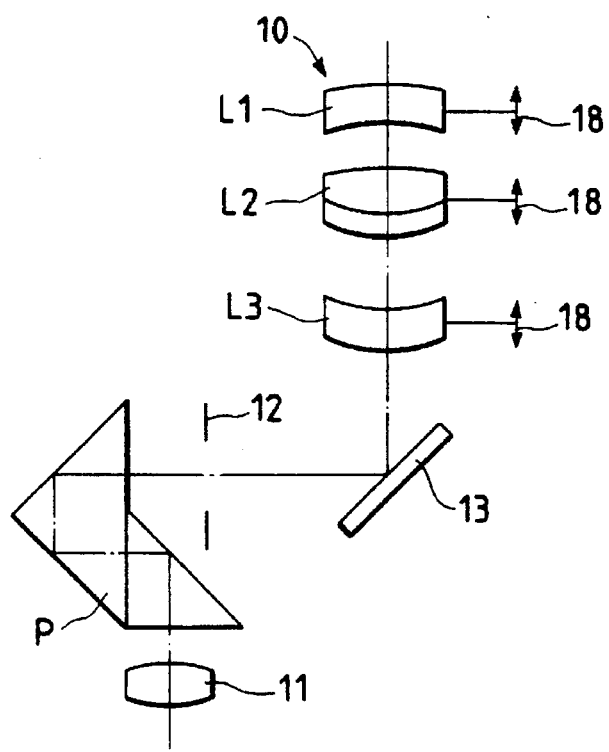
FIG. 5 is an optical diagram showing schematically a finder assembly according to a fourth embodiment of the present invention.

A fourth embodiment of the present invention is shown in FIG. 5 in which only specified lens groups of those which form the objective optical system 10 are moved to adjust the focal position thereof. Lenses L1, L2 and L3 are each fitted with a device 18 for effecting positional adjustment along the optical axis and their positions can be adjusted independently of one another. The sensitivity of individual lenses L1–L3, or the amount of change in focal position in response to a specified amount of their positional adjustment along the optical axis, differs from one lens group to another. Thus, the lens group (or groups) which should be moved to compensate for the focal position change of the objective optical system 10 can be determined according to the specific type of objective optional system being employed.

Figure 6:
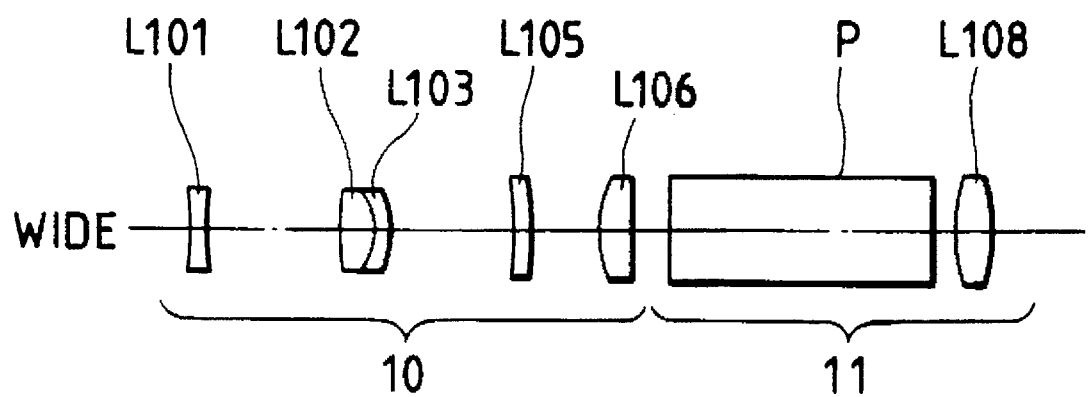
FIG. 6 is an optical diagram depicting a specific example of the zoom finder assembly as it is focused at the wide-angle end.
Figure 7:
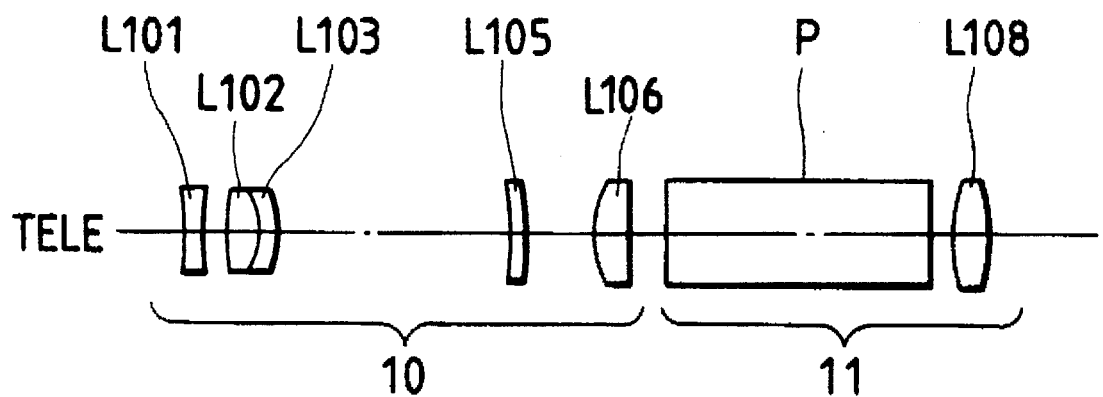
FIG. 7 is an optical diagram depicting the zoom finder assembly of FIG. 6 as it is focused at the telephoto end.

Hereinbelow, the effects are discussed which will be caused on the dioptric strengthening if changes occur in the focal lengths of the objective optical system and the eyepiece optical system in a Kepler-type zoom finder assembly. FIGS. 6 and 7 show schematically a Kepler-type finder assembly that has an objective optical system 10 including a fixed lens L101, movable zooming lenses L102 and L103, a fixed lens L105 and a field lens L106, and an eyepiece optical system 11 which includes an eyepiece lens L108. FIG. 6 depicts when the assembly is focused at the wide-angle end, and FIG. 7 illustrates the assembly being focused at the telephoto end.

Figure 8:
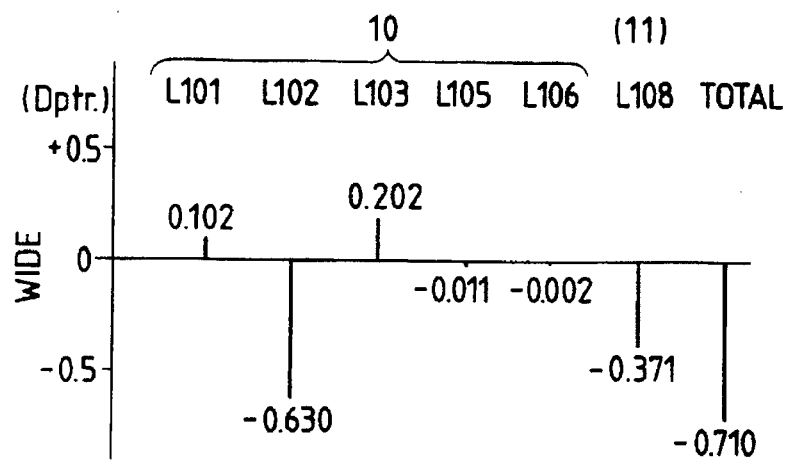
FIG. 8 is a graph showing how the dioptric strength is influenced by changes in the focal lengths of the individual lenses that form the zoom finder assembly shown in FIG. 6.
Figure 9:
FIG. 9 is a graph showing how the dioptric strength is influenced by the focal length changes of the individual lenses that form the zoom finder assembly shown in FIG. 7.

FIGS. 8 and 9 are graphs illustrating how the dioptric strength is influenced if the focal lengths of the individual lenses which form the Kepler-type finder assembly are each extended by 1%. FIG. 8 is directed to when the assembly is focused at the wide-angle end, and FIG. 9 relates to when the assembly is focused at the telephoto end. In each graph, the value "0" is assigned if the dioptric strength does not deviate from the design value (−1 diopters), and the effects of the individual lenses on the dioptric strength are expressed in relative values. From the two graphs, it is shown that: lenses which greatly affect the dioptric strength are positioned in the objective optical system 10 rather than in the eyepiece optical system 11; the stronger the lens power (e.g., as in L102), the greater the effect on the dioptric strength by the focal length change; and a lens influences the dioptric strength differently at the wide-angle and telephoto ends of the system.

Figure 10:
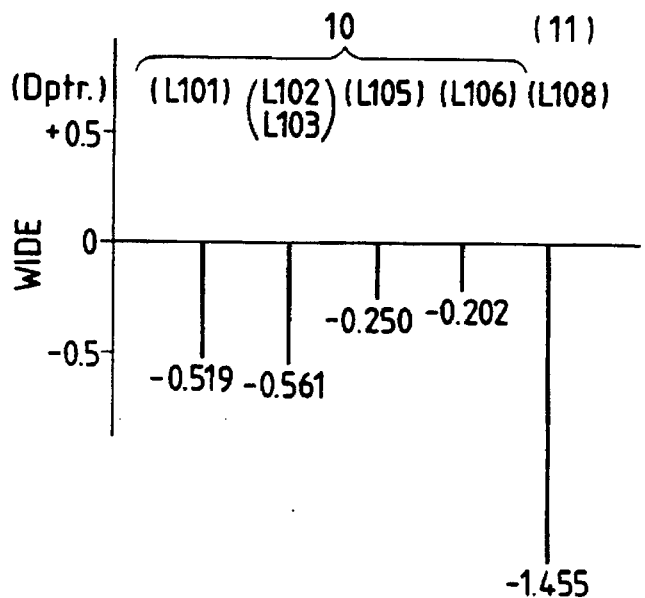
FIG. 10 is a graph showing how the dioptric strength is influenced by the position changes of the individual lens groups that form the zoom finder assembly shown in FIG. 6.
Figure 11:
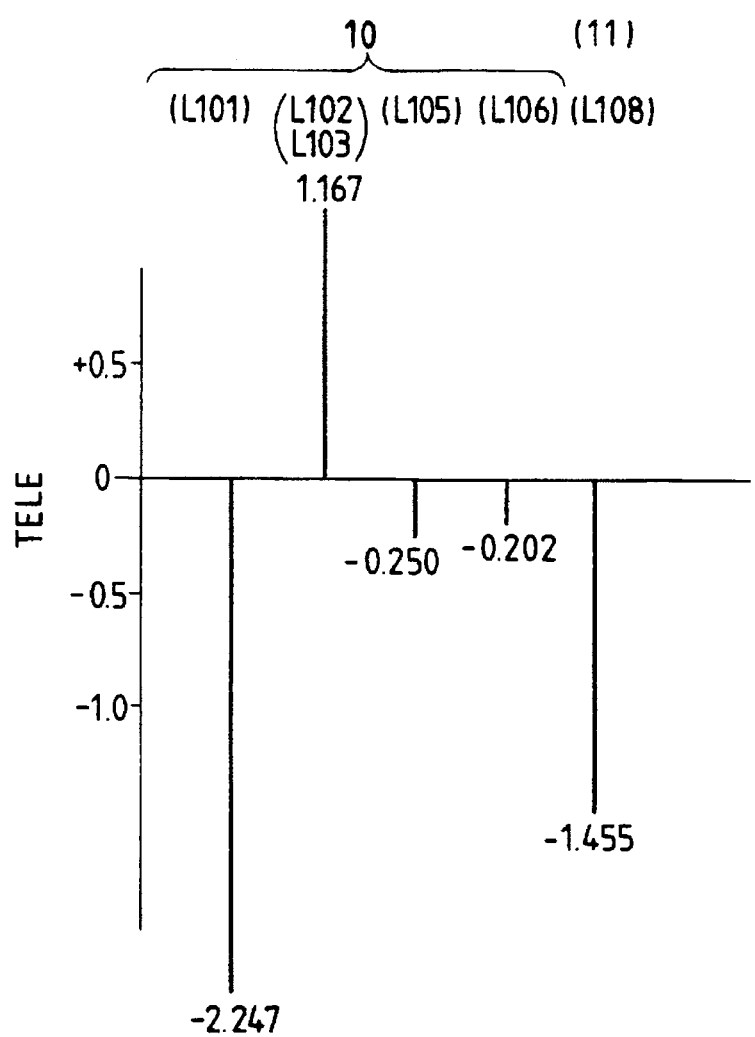
FIG. 11 is a graph showing how the dioptric strength is influenced by the position changes of the individual lens groups that form the zoom finder assembly shown in FIG. 7.

FIGS. 10 and 11 are graphs showing how the dioptric strength is influenced if individual lens groups in the finder assembly are moved by 1 mm toward the eye along the optical axis. As mentioned above in connection with FIGS. 8 and 9, the graphs show that even in the case of the same lens in the objective optical system 10, the position change of the lens will influence the dioptric strength differently at the wide-angle and telephoto ends. Thus, the lenses will have different sensitivities at the wide-angle and telephoto ends in response to a positional change along the optical axis.

Thus, in the embodiment shown in FIG. 5 which is designed to perform adjustment of the diopter setting by moving specified lens groups forming the finder assembly, the sensitivity of individual lens groups in the adjustment of the diopter setting may be considered in performing satisfactory dioptric adjustment. In this case, performing adjustments at both the telephoto and wide-angle ends is not critical. Instead, the dioptric strength may be adjusted to the design value at the telephoto end while disregarding a small offset in the dioptric strength at the wide-angle end. This is a characteristic benefit of the finder assembly with which the self-adjusting action of the human eye can be expected. Further, the finder assembly clearly differs from the picture taking optical system which must be focused with close tolerances at every focal length.

As described above, the finder assembly of the present invention enables the object image formed by the objective optical system to be observed via the eyepiece optical system, and includes an object side image forming position adjusting device which adjusts the position where an image is formed by the objective optical system and which is provided in association with the objective optical system. Thus, if the position of the image formed by the objective optical system varies, it may be properly adjusted such that the viewer can observe the image clearly. Particularly, the finder assembly can make an adjustment such that the position where an image is formed with the objective optical system is brought into registry (e.g., aligned) with the plane of the field frame, thereby enabling both the field frame and the image to be observed with the same diopter setting.

Figure 13:
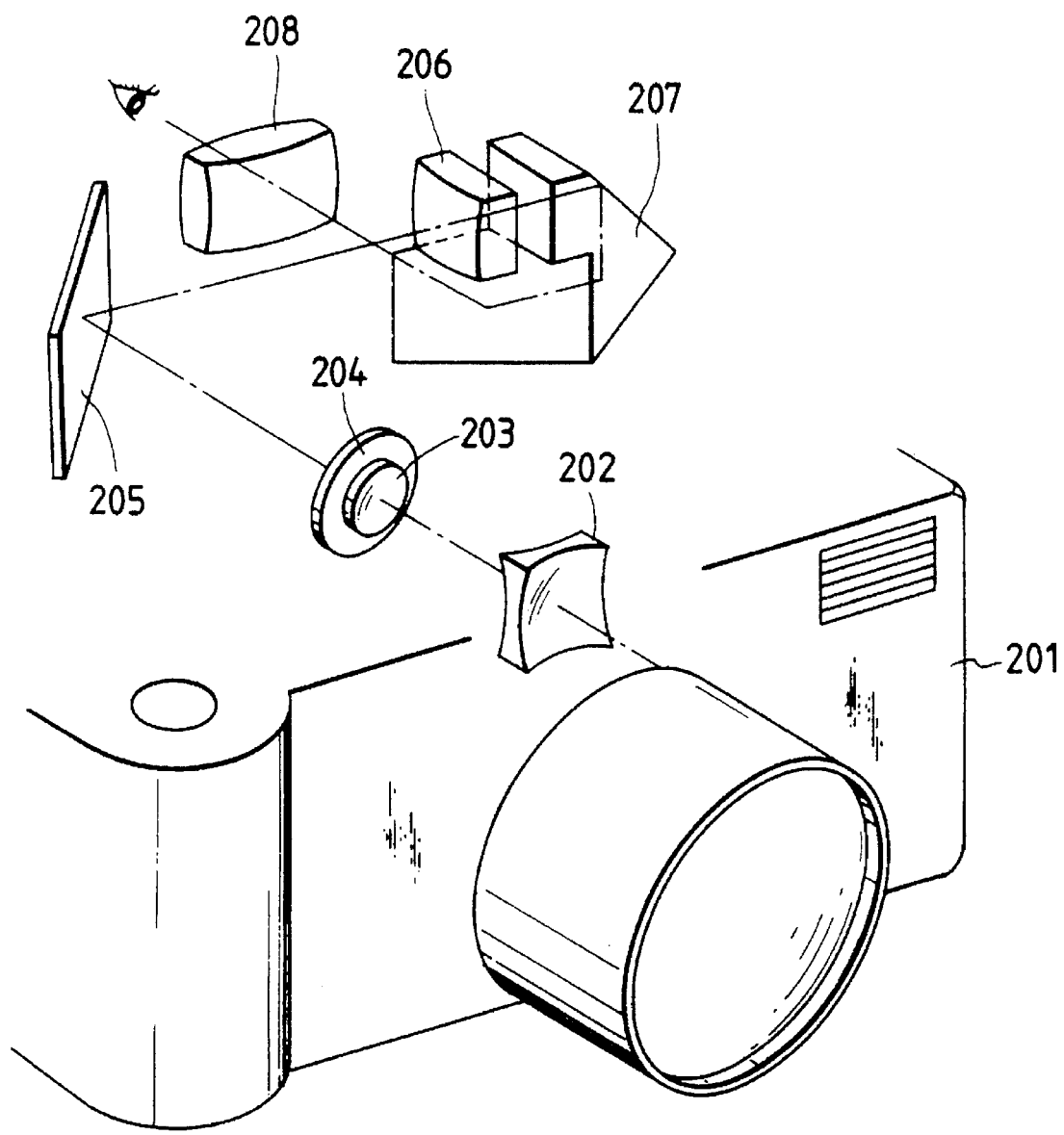
FIG. 13 is a schematic perspective view showing a specific embodiment of a viewfinder optical system according to the invention.
Figure 14:
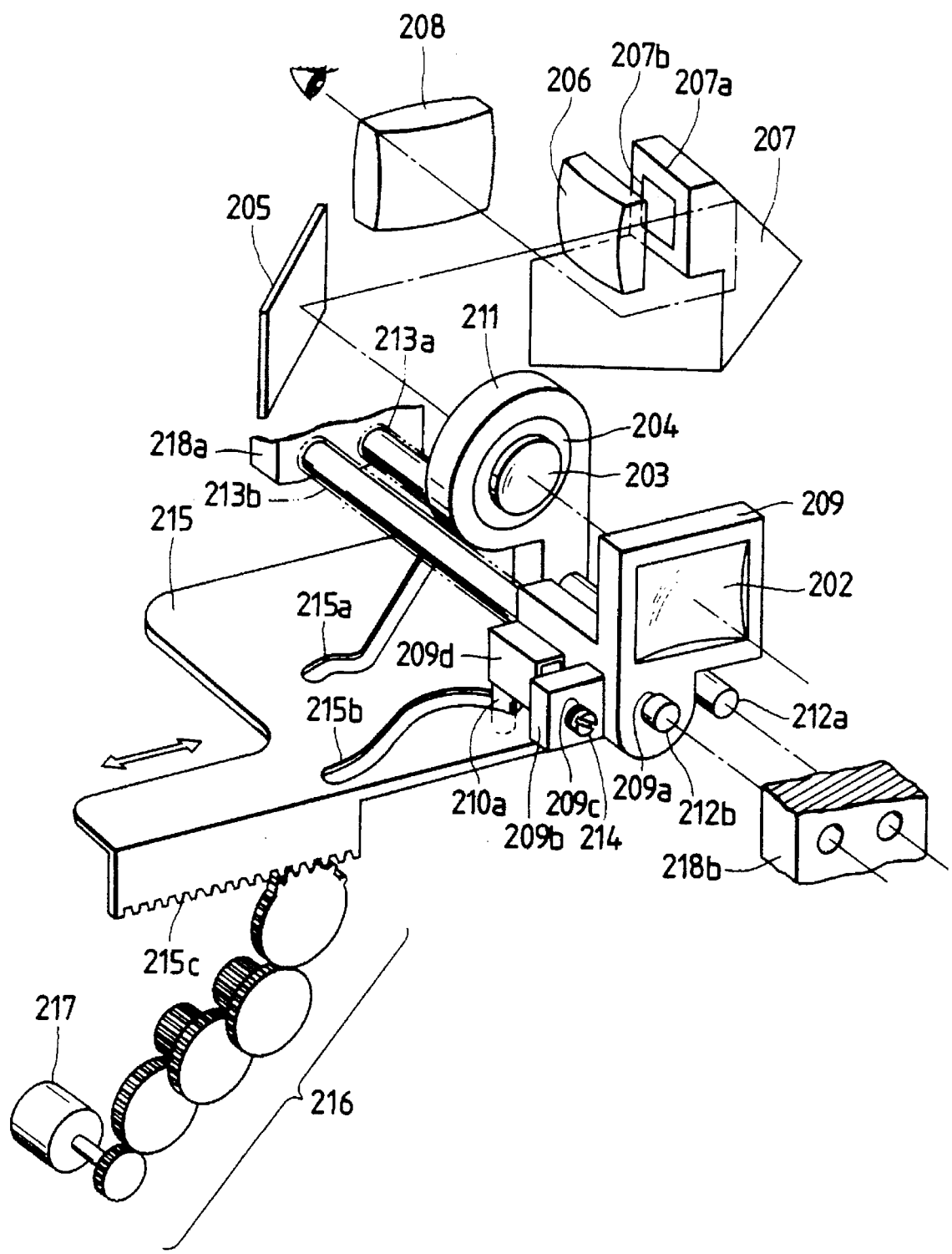
FIG. 14 is a schematic perspective view showing a zooming mechanism used in the viewfinder shown in FIG. 13.

Other embodiments of the invention will now be described in which the above-described inventive concept is applied to a real image type zoom finder. FIG. 13 shows a finder optical system. FIG. 14 is a schematic perspective view showing the viewfinder optical system. As shown in FIGS. 13 and 14, the objective optical system includes a first movable objective lens 202 carried by a first lens frame 209 (for supporting movable lens elements), a second movable objective lens 203 carried by a second lens frame 211 (for supporting movable lens elements), a third movable lens 204, a mirror 205 and a fixed objective lens 206. A Porro prism 207 is provided behind the fixed objective lens 206 for inverting the right and left and the up and down directions of the object image obtained through the objective lens system. A field frame 207b is depicted on a surface 207a of the Porro prism 207 behind the fixed objective lens 206. An ocular lens 208 of the ocular optical system is located behind the Porro prism 207.

Figure 15:
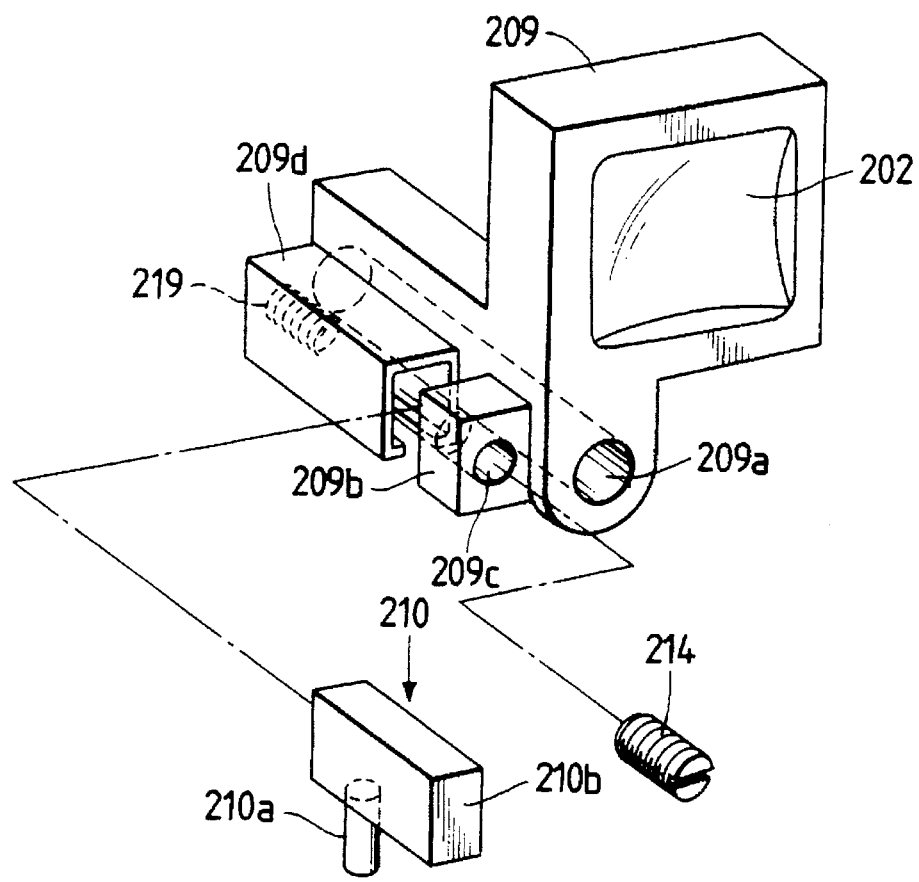
FIG. 15 is a schematic view showing various components including the lens frame shown in FIG. 14.
Figure 16:
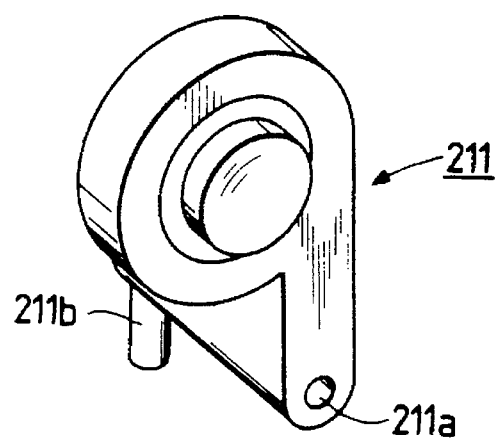
FIG. 16 is a perspective view showing a second lens frame shown in FIG. 14.

As shown in FIG. 16, the second lens frame 211 has a hole 211a extending in parallel to the optical axis. A pin 211b is provided at a lower portion of the second lens frame 211. In FIG. 14, the pin 211b is not shown. A guide shaft 212a is engaged with the hole 211a of the second lens frame 211 so that the second lens frame 211 is movable along the optical axis. On the other hand, the first lens frame 209 has a hole 209a into which a guide shaft 212b in parallel to the guide shaft 212a is inserted, so that the first lens frame 209 is movable in the optical axis direction. The first lens frame 209 has a projecting arm 209b in which a female screw 209c is formed for adjusting a diopter. A fine adjustment male screw 214 is threadedly engaged with the female screw 209c. A guide case portion 209d is formed on a side wall of the first lens frame 209. As shown in FIG. 15, a movable element 210 (i.e., driven member) having a pin 210a is inserted into the guide case portion 209d so the movable element 210 is movable in the optical axial direction of the view finder. First, a biasing spring 219 (indicated by dotted lines) is inserted into the guide case portion 209d and subsequently, the movable element 210 is inserted thereinto as shown in FIG. 15.

A means (zooming means) for moving the first and second lens frames in the optical axis direction includes a lens frame driving cam plate 215 as shown in FIG. 14. Two cam slots 215a and 215b are formed in the lens frame driving cam plate 215 with the pin 211b of the lens frame 211 being slidingly inserted into the cam slot 215a and with the pin 210a of the movable element 210 provided in the lens frame 209 being slidingly inserted into the cam slot 215b. The front ends and the rear ends of the guide shafts 212a and 212b are fixed to a camera body 201 through support members 218a and 218b. A biasing spring 213a is laid around the guide shaft 212a between the support member 218a and the second lens frame 211 and in the same way a biasing spring 213b is laid around the guide shaft 212b between the support member 218a and the first lens frame 209, whereby the pins 210a and 211b corresponding, respectively, to the first lens frame 209 and the second lens frame 211 come into sliding contact with one-side inner surfaces of the cam slots 215b and 215a of the lens frame driving cam plate 215 without fail. The lens frame driving cam plate 215 has at one end a rack 215c which in turn engages with a drive motor 217 through a cam drive gear train 216.

With such an arrangement, by moving the lens frame driving cam plate 215 in directions indicated by a two-head arrow shown in FIG. 14, the first movable objective lens 202, the second movable objective lens 203 and the third movable objective lens 204 of the finder optical system in the optical axial direction to thereby perform a zooming operation. The cam slots 215a and 215b formed in the lens frame driving cam plate 215 are designed so as to perform the zooming operation and so that an image of a standard object distance is always kept at the viewfield frame 207b during the zooming operation.

The diopter adjustment of the objective lens system will be performed as follows. The fine adjustment male screw 214 which comes into contact with a depressed front face 210b of the movable element 210 is manually rotated so that the movable element 210 and the first lens frame 209 are moved relative to each other in the optical axis direction. The position of the movable element 210 depends upon the cam slot 215b, and thus the position of the first lens frame 209 corresponding to the position of the movable element 210 is determined by adjusting the fine adjustment male screw 214. Accordingly, in the case where a distance between the first movable lens 202 and the second and third movable lenses 203 and 204 is changed, the change in distance thereof is kept constant to thereby effect the diopter adjustment. In other words, according to this embodiment, it is possible to correct a positional displacement of the position of the objective lens system relative to the viewfield frame 207b and to make the position of the image identical with the same position of the surface of the viewfield frame 207b.

As has been described above, in the foregoing embodiment, one, closest to the object, of a plurality of lens groups of the objective system has the objective focal point adjustment means. It is apparent that the invention is not limited to or by this specific arrangement. For example, it is possible to apply the objective focal distance adjustment means to all or any of the plural lens groups of the objective system. Actually, it would be preferable to apply the adjustment means to the lens group having the largest refractive power in the lens groups.

As has been described above, according to the present invention, in the viewfinder where the image through the objective system is observed through the ocular optical system, in the case where the focal position of the objective optical system is offset from the regular or reference position, it is possible to correct this and to view a clear image. In particular, since the position of the objective optical system may be identical with that of the viewfield frame, it is possible to observe the viewfield frame and the image at the same diopter.

Still another embodiment of the invention will now be described in which the same reference numerals as those of the embodiment shown in FIGS. 13 to 16 are used to indicate the like components or members.

Figure 17:
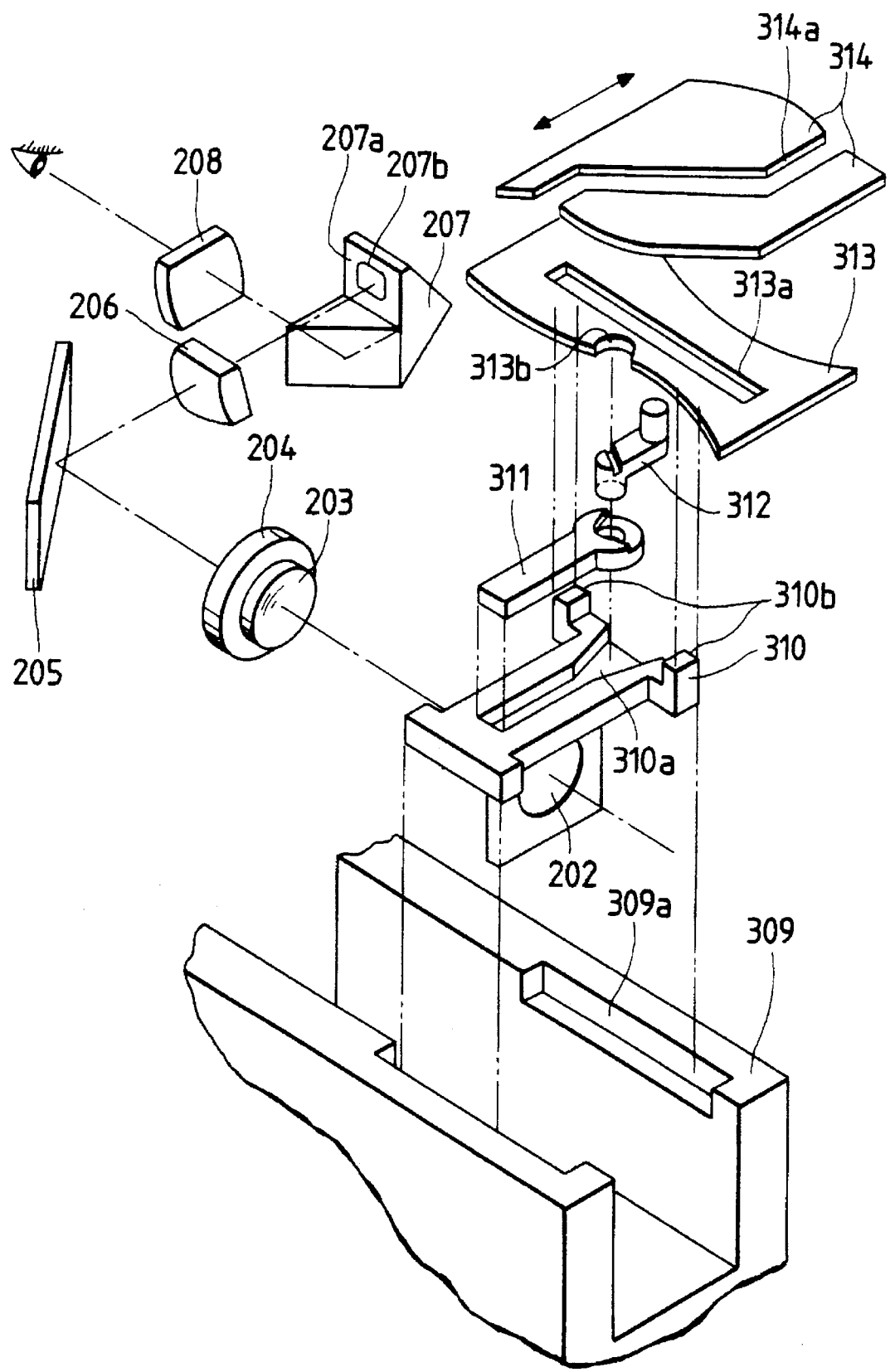
FIG. 17 is a developed perspective view showing another specific embodiment of the invention.

As shown in FIG. 17, a lens frame 310 for carrying thereon a first movable objective lens 202 is slidingly engaged with a lens frame guide groove 309a of a lens frame holder 309 in the direction of the optical axis. A sliding member 311 is inserted into a sliding member guide groove 310a formed in an upper portion of a lens frame 310 for adjustment. Thus, the sliding member 311 may be slid in a direction perpendicular to the optical axis of the objective system.

Figure 18:
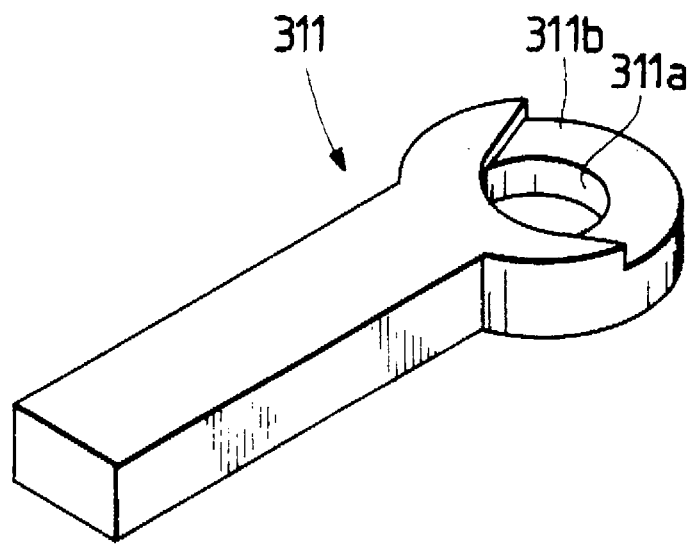
FIG. 18 is a perspective view showing a sliding member shown in FIG. 17.
Figure 19:
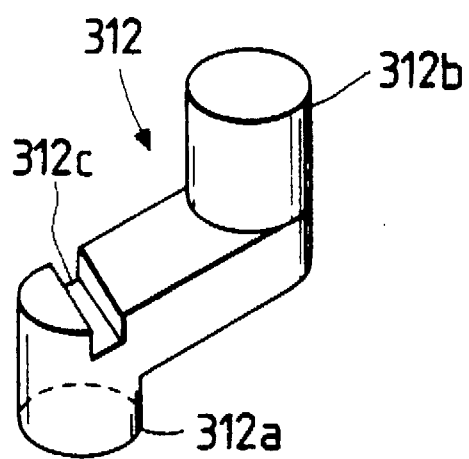
FIG. 19 is a perspective view showing a driven member shown in FIG. 17.

As shown in FIG. 18, a hole 311a is formed in a central portion of a circular portion formed at one end of the sliding member 311. A sector-shaped stepped portion 311b is formed along the hole 311a. A cylindrical portion 312a of a driven member 312 is pressingly inserted into the hole 311a as shown in FIG. 20. The cylindrical portion 312a of the driven member 312 is engaged with the hole 311a with a circumferential frictional resistance R above a predetermined level. Namely, the cylindrical portion 312a is inserted therein so that, when a force greater than the frictional resistance R is applied to the cylindrical portion 312a in the circumferential direction, the cylindrical portion 312a is rotated. The driven member 312 is rotatable within a range of the sector-shaped stepped portion 311b.

A linear guide groove 313a is formed in a linear guide plate 313 as shown in FIG. 17. A sliding portion 312b of the driven member 312 is brought into sliding contact with an inner surface of the linear guide groove 313a. Thus, the linear guide plate 313 is used to guide the movement of the driven member 312 in the direction along the optical axis. The linear guide plate 313 is fixed to the lens frame holder 309 and also serves to prevent the lens frame 310 from falling apart from the lens holder 309 when the lens frame 310 is moved in the direction along the optical axis. Projections 310b of the lens frame 310 are in sliding contact with the inner surface of the linear guide groove 313a in the same way as the sliding portion 312b.

A lens frame driving cam plate 314 as a zooming means includes a cam groove 314a. The sliding portion 312b of the driven member 312 is brought into sliding contact with the inner surface of the cam groove 314a. The lens frame driving plate 314 is drivingly moved in a direction perpendicular to the optical axis through a drive motor and a gear train (not shown), so that the first movable lens 202 is moved in the direction along the optical axis through the sliding portion 312a of the driven member 312, the sliding member 311 and the lens frame 310. The lens frame driving cam plate 314 has another cam groove (not shown) than the cam groove 314a. The cam groove is used to drive the second movable lens 203 and the third movable lens 204 through a suitable means (not shown).

With such a structure, by moving the lens frame driving cam plate 314 in the directions indicated by a two-headed arrow in FIG. 17, the first, second and third movable lenses of the viewfinder are moved in the direction along the optical axis to thereby effect the zooming operation. The cam slots are designed in the same concept as that of the preceding embodiment.

Figure 20A:
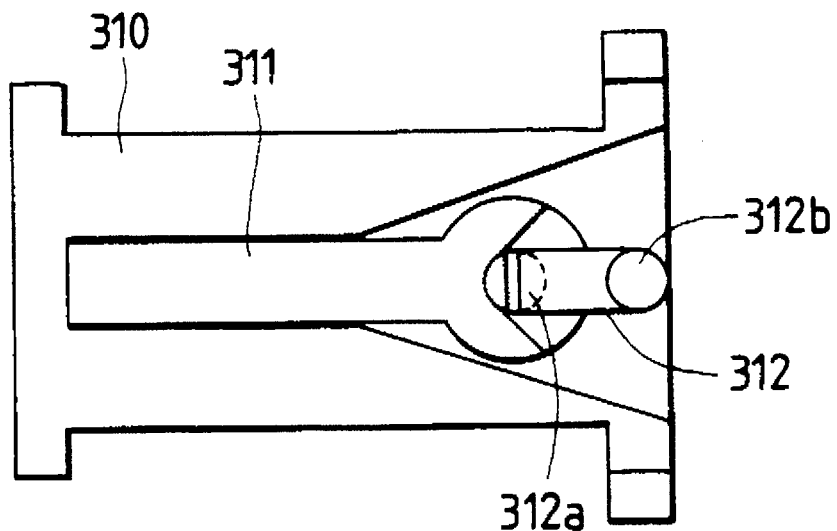
FIGS. 20a and 20b are plan views showing primary parts of a diopter adjustment device used in FIG. 17.
Figure 20B:
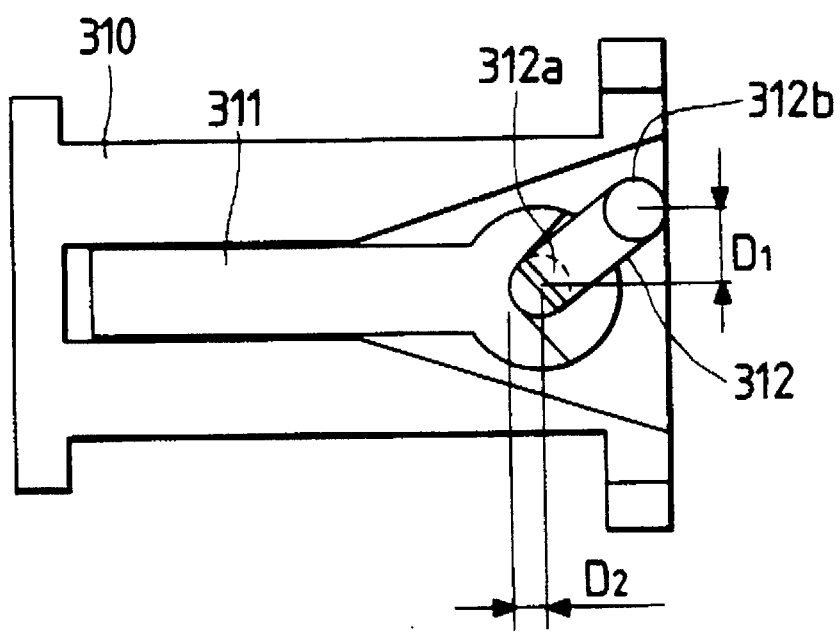

The diopter adjustment means for the above-described zoom viewfinder will be explained. FIGS. 20a and 20b show the sliding member 311 received in the lens frame 310 and the driven member 312 engaged with the sliding member 311. In FIG. 20a, the center of the sliding member 312b of the driven member 312 and the center of the cylindrical portion 312a are located on the same straight line as the centerline of the sliding member 311 in the axial direction. In FIG. 20b, the driven member 312 has been rotated about the center of the cylindrical portion 312a. A movement distance D1 is generated in the direction along the optical axis from the axial centerline of the sliding member to the center of the sliding portion 312a. In accordance with this movement, the center of the cylindrical portion 312a has been moved a distance D2 in the longitudinal direction of the sliding member 311. It is possible to adjust the diopter by adjusting the movement distance D1. An adjustment groove 312c is formed on a top portion of the cylindrical portion 312a for rotating the driven member 312. It is possible to insert a screw driver into the adjustment groove 312c and rotate it for the adjustment. An adjustment hole 313b formed in the linear guide plate 313 is used for adjustment, allowing the screw driver to pass through the hole 313b.

As has been described above, the cylindrical portion 312a of the driven member 312 is pressingly engaged with the hole 311a of the sliding member 311 with the frictional resistance R above a predetermined level. On the other hand, a rotational force F such that the lens frame driving plate 314 urges the cylindrical portion 312a to rotate is applied to the cylindrical portion 312a of the drive member 312. Accordingly, in the embodiment, the resistance R is set to be greater than the force F. With such a construction, when the diopter adjustment is effected on the objective lens side, a force greater than the frictional resistance R is applied to the cylindrical portion 312a, so that the cylindrical portion 312a is rotated for diopter adjustment. After the diopter adjustment, the driven member 312 is never rotated relative to the sliding member 311 during the regular zooming operation. Thus, it is possible to correct the displacement in position between the focal image of the objective lens system and the position of the viewfield frame 307b to identify them with each other.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A diopter adjusting device for adjusting the diopter setting of a finder assembly, said finder assembly comprising an objective optical system having a positive power, having a plurality of lens groups and including at least one plastic lens, for forming an image of an object, and an eyepiece optical system for viewing therethrough the image formed by the objective optical system, said device comprising a field frame positioned in an image forming plane of said objective optical system, and further comprising:

an object side image forming position adjusting means for adjusting a position at which said image is formed by said objective optical system in order to compensate for a change in a focal length of said objective optical system caused by a change in power of said plastic lens due to changing ambient conditions, said object side image forming position adjusting means comprising an optical member which is situated in an optical path between the objective optical system and the field frame and which has a power which varies in in response to changes in at least one of temperature and humidity.

2. A device according to claim 1, wherein said optical member comprises a mirror, said mirror including a reflecting member and a substrate joined to said reflecting member, said substrate having one of a coefficient of thermal expansion and an expansion coefficient due to moisture absorption different from that of said reflecting member.

3. A device according to claim 2, wherein said reflecting member comprises aluminum.

4. A device according to claim 2, wherein said substrate comprises resin.

5. A device according to claim 2, wherein said mirror includes means for deforming such that said mirror is deformable to have a concave surface when at least one of said temperature and said humidity increases above a predetermined level.

* * * * *